Aug. 19, 1924.
F. J. MacDONALD
1,505,212
STOCK CUTTING APPARATUS AND METHOD
Filed Dec. 4, 1918   2 Sheets-Sheet 1
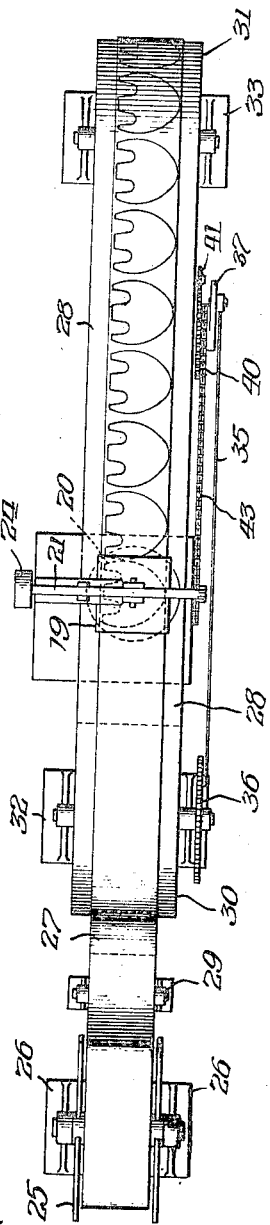
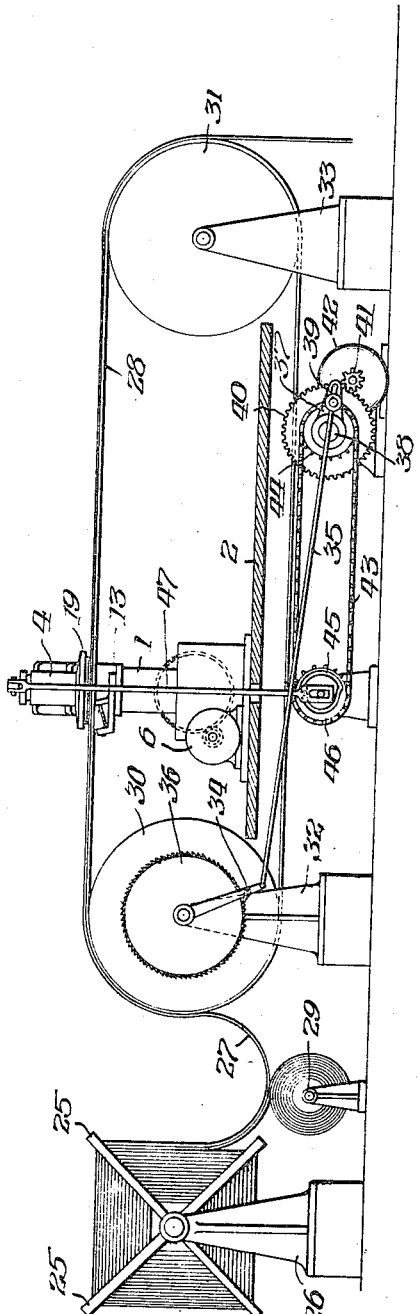

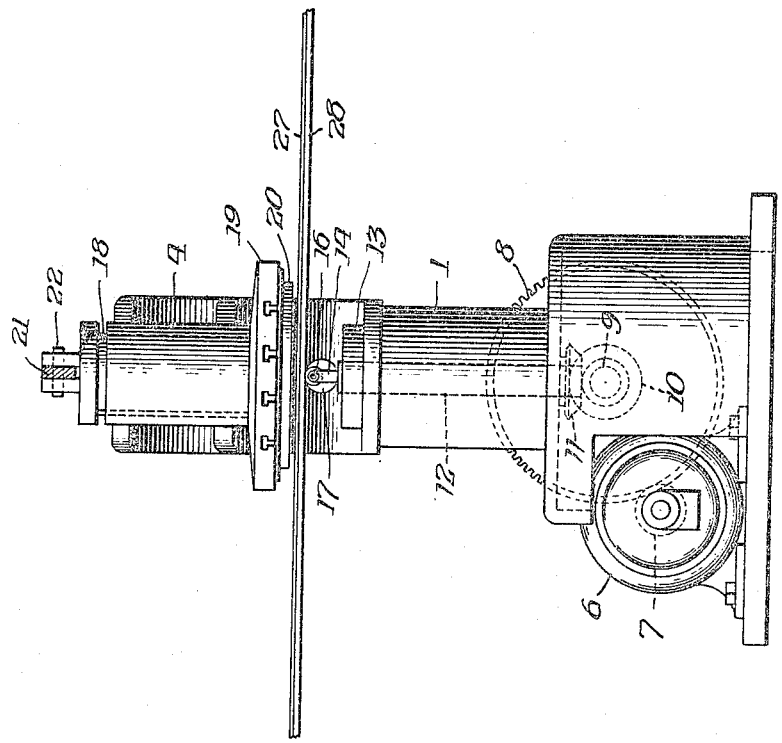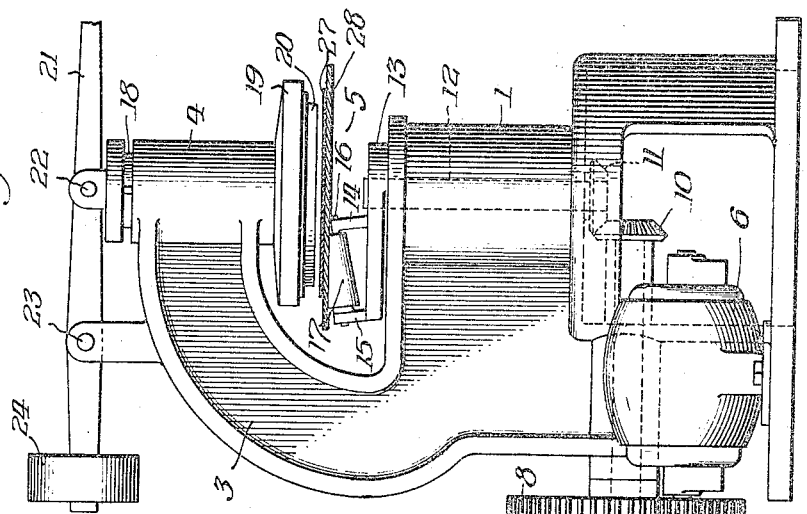

Patented Aug. 19, 1924.

1,505,212

UNITED STATES PATENT OFFICE.

FRANK J. MacDONALD, OF AKRON, OHIO, ASSIGNOR TO THE FIRESTONE TIRE AND RUBBER COMPANY, OF AKRON, OHIO, A CORPORATION OF OHIO.

STOCK-CUTTING APPARATUS AND METHOD.

Application filed December 4, 1918. Serial No. 265,305.

*To all whom it may concern:*

Be it known that I, FRANK J. MACDONALD, a citizen of the United States, residing at Akron, in the county of Summit and State of Ohio, have invented certain new and useful Improvements in Stock-Cutting Apparatus and Methods, of which the following is a specification.

This invention relates to a machine for cutting blanks from sheets of uncured rubber and preparing them for use in the manufacture of boots and shoes manufactured from rubber and fabric, and while it relates to that particular art, its use is not so limited, but may be adapted for other arts.

So far as known to me, the only method at present in use for cutting the thin sheet of green uncured rubber, which forms a part of the rubber boot, consists in laying over a sheet of rubber a pattern and then cutting around the pattern with a hand tool. Owing to the characteristics of the thin sheeted rubber, cutting it by machinery has presented certain difficulties which make it impracticable to operate upon it by any of the well known devices heretofore in use, and as a consequence the hand cutting has survived to the present time. Needless to say, the devising of a practical machine which will perform the cutting operation by machinery, greatly cheapens the rubber shoe manufacture, and results in a more accurate cutting operation.

It is the purpose of the present invention to construct a machine which will rapidly and accurately cut blanks from sheeted rubber preparatory to their manufacture in boots and shoes. Other objects and advantages will become apparent as the description proceeds, and it will also be evident that the machine shown is illustrative merely and is subject to modifications and changes without departing from the present invention.

Fig. 1 is a side elevation of the cutting apparatus forming a part of the present invention in combination with a stock feeding and conveying device, and also in combination with a mechanical device for operating the cutter.

Fig. 2 is a plan view.

Fig. 3 is an elevation of the cutting apparatus, showing a modification of the operating means.

Fig. 4 is a view at right angles to Fig. 3.

The apparatus for cutting the rubber stock comprises a frame work or standard 1 which is secured to a support 2, the upper portion of the standard being formed with a goose neck 3, the extremity of which is formed with a vertical sleeve 4 directly over the main position of the frame work. Between the standard 1 and the sleeve 4 is an opening 5 through which the stock passes and in which the cutting operation takes place.

On the base of the machine may be secured a motor 6 provided with a pinion 7 in mesh with a large driving gear 8. The shaft 9 of the gear is arranged in horizontal bearings in the lower part of the standard and carries a bevel pinion 10 in mesh with a bevel pinion 11 on the lower end of the vertical shaft 12 rotatably mounted in the standard. The upper end of the shaft is located in the space 5 and has secured to it a plate 13. At one side of the center of this plate are arranged vertical uprights or lugs 14—15, in which is mounted an inclined shaft 16. Between the uprights on the shaft is mounted a rotary conical roller 17, the inclination of the shaft and the form of the roller being so arranged that the upper surface of the roller is in a horizontal plane.

The motor is given a constant rotation and through the gearing described the plate 13 is also rotated about a vertical axis and the roller 17 is given a constant travel along a circular path.

In the vertical sleeve there is slidably mounted a plunger shaft 18, the lower end of which carries a die plate 19 to the under face of which is secured a die 20 of any configuration which it is desired to cut. In Fig. 2 is shown a form of die designed to cut the vamp of a rubber boot. While only one die is shown, it is obvious that a plurality of dies for cutting one or more parts simultaneously may be substituted therefor, also while only one plate is shown, a plurality of plates, each carrying a roller, may be substituted for cutting out a plurality of pieces of stock. If greater speed is desired, a plurality of rollers may be employed instead of a single roller, and different forms of rollers with different methods of traversing them may be employed, all within the province of mechanical skill founded upon the present invention.

Any suitable means may be employed for raising or lowering the die plate. In Fig.

3 is shown a hand lever 21 pivoted to the plunger at 22 and to the goose neck at 23, the free end being provided with a counterweight 24.

The sheeted rubber and liner is wound together on a reel 25 supported on standards 26, the rubber 27 being led on to a continuous belt or supporting surface 28, the liner being wound on to a reel 29.

There is shown herein a continuous belt which passes over pulleys 30 and 31 supported in standards 32 and 33, the pulleys or drums being moved intermittently by a pawl 34 oscillated by a rod 35 over a ratchet 36 secured to the shaft of the drum 30. The belt or conveyor 28 is preferably formed of tempered steel or galvanized metal, although any other suitable material may be employed. It must be of such material that it will not be cut by the die, will hold the sheeted rubber in flat condition, and is flexible enough to pass around the pulley. Any suitable feeding and supporting structure may be substituted for the metallic belt shown.

As shown in the drawings, the supporting element for the rubber is passed through the space 5 between the plate 13 and the die plate 19. When the plunger 18 is brought down toward the circular moving roll 17, the belt 28 is pressed against the die and pressure of the roll 17 transmitted through the belt severs the rubber in accordance with the pattern of the die. By this peculiar method of cutting rubber stock, no movement occurs in the stock and the pieces are cut accurately to size. Where attempts have been made to die out rubber in the ordinary manner, that is by bringing the die down and forcing it into the rubber, there has always been a slight movement in the part of the rubber, in addition to which the edges of the piece have been forced into the bed against which the die was forced, with the result that when it was attempted to lift the rubber, it was distorted and unfit for use.

While I have shown the die as approaching the supporting structure and moving roller, this is not essential and any other equivalent means may be used to cause the two elements to approach each other and cut the rubber.

The link 35 may be reciprocated by means of a crank 37 attached to a constantly rotating shaft 38, a slot 39 being provided for adjustment of the throw of the pawl, as will be readily understood. The shaft 38 carries a gear 40 meshing with a pinion 41 on a motor 42.

If it is desired, mechanical devices may be substituted for the hand lever in bringing the plate and die together, and proper mechanism designed to coordinate the movement of the die with the movement of the belt so that they will take place alternately. A simple mechanical device is shown in Fig. 1, comprising a sprocket chain 43 connecting a sprocket 44 on the shaft 38 with a similar sprocket 45 which is connected to a cam wheel 46 provided with a track to operate a vertical link 47 pivoted at its upper end to the lever 21.

It will be understood that the plunger is lowered onto the supporting surface while it is stationary, and while the two are held in contact, progressive rolling pressure is exerted on the sheeted rubber through the supporting structure by the conical roller. The cutter is held in contact with the rubber while one or more revolutions of the conical roller are made when the two cutting instrumentalities are separated, and the rubber is advanced to the next cutting point.

It will be noted from an inspection of Figs. 1 and 2 that the cutting apparatus is placed at one side of the center between the pulleys 30 and 31, so that a considerable number of the blanks are exposed on the surface of the belt. This is to enable the operators to inspect the cut blanks, to lay on the pieces of fabric which are combined with the rubber to make the element entering into the boot structure, and to remove the blanks from the belt. The residue from the sheet rubber passes over the pulley 31 and is collected and returned to the calender.

Modifications, other than those shown and described, may be suggested in embodiments of the invention. The sheeted rubber instead of being taken from reels may be led directly from the calendering or sheeting supply and thus the use of liner dispensed with. Such changes as may be made in the invention and within the scope of the appended claims are intended to be covered herein, and I do not limit myself to this exact means of carrying my invention into effect.

I claim:

1. The method of cutting sheet rubber or similar material, comprising the steps of bringing said material into contact with a cutting die, and while one surface thereof is held against the die, exerting progressive pressure against the opposite surface of the material.

2. The method of cutting sheet rubber or similar material, comprising the steps of bringing said material into contact with a cutting die, and while one surface of said material is held against the die, exerting progressive rolling pressure against the opposite side of the material.

3. The method of cutting sheet rubber, comprising the steps of supporting said rubber on a metallic sheet, placing said rubber in contact with a cutting edge while on said sheet, and exerting a pressure through said sheet toward said edge.

4. The method of cutting sheet rubber, comprising the steps of supporting said rubber on a metallic sheet, placing said rubber in contact with a die while on said sheet and exerting rolling pressure through said sheet toward the die.

5. The method of cutting sheet rubber, comprising the steps of supporting said rubber on a metallic sheet, placing said rubber in contact with a die while on said sheet and exerting progressive pressure through said sheet toward and along the edge of said die.

6. An apparatus for cutting sheet rubber or similar material, comprising a cutting blade, means for holding the cutting blade and the sheet material in contact and a traveling pressure element, adapted to pass across said material and force it into the blade.

7. An apparatus for cutting sheet rubber, comprising a cutting die, means for holding the die and the sheet rubber in contact through the extent of said die and a traveling roller adapted to pass across said rubber and force it toward the die.

8. An apparatus for cutting sheet rubber, comprising a cutting die, means for supporting said rubber, means for bringing said die and said rubber in contact, and roller means operative over the surface of said supporting means to force said rubber into said die.

9. An apparatus for cutting rubber, comprising a cutting die, a metallic sheet for supporting said rubber, means for bringing said rubber and said die in contact, and pressure means movable over the surface of said metallic sheet to force it toward the die.

10. An apparatus for cutting rubber, comprising a cutting die, a metallic sheet for supporting said rubber, means for bringing said rubber and said die in contact and pressure means movable progressively over the under surface of said sheet throughout the extent of the die to force the sheet toward the die.

11. An apparatus for cutting rubber, comprising a cutting die, a metallic sheet for supporting said rubber, means for bringing said rubber and said die in contact, and a pressure roller contacting the under side of said sheet and movable over the surface throughout the extent of the die.

12. A rubber cutting apparatus including a sheet rubber supporting belt, a blade above the belt, means for causing said belt and said blade to approach to bring the blade in contact with the rubber, and a pressure element below the belt, and means to cause said pressure element to move over the belt.

13. A rubber cutting apparatus including a metallic belt, a cutting element above said belt, a pressure element below said belt, means for causing said elements to come together, said pressure element exerting cutting pressure through said metallic belt.

14. A rubber cutting apparatus including a belt, a cutting element above said belt, a pressure element below said belt, means for causing said elements to come together, and means for moving said pressure element across the belt while the cutting element is maintained in contact with the rubber.

15. A rubber cutting apparatus including a sheet rubber supporting belt, a cutting element movable toward and from one side of said belt, and a pressure element movable transversely of said belt, and located on the opposite side of said belt.

16. A rubber cutting apparatus including a metallic sheet rubber supporting belt, a cutting die movable toward and from one side of said belt, and a pressure element located on the opposite side of said belt and movable transversely thereof.

17. A rubber cutting apparatus including a sheet rubber supporting belt, a vertically reciprocable plunger above said belt, a cutting die on said plunger, and a bodily movable roller below and in contact with said belt.

18. A rubber cutting apparatus including a sheet rubber supporting belt, a vertically reciprocable plunger above said belt, a die on said plunger, a pressure roller below and in contact with said belt, and means for moving said pressure roller in an orbit comprising the outline of said die.

19. A rubber cutting apparatus including a metallic supporting belt, a vertically reciprocable plunger above said belt, a cutting die on said plunger, and a bodily movable roller below and in contact with said belt.

20. A cutting apparatus including a metallic supporting belt, a vertically reciprocable plunger above said belt, a cutting die on said plunger, a pressure roller below and in contact with said belt, and means for moving said pressure roller in a path below said belt.

21. A cutting apparatus including a metallic supporting belt, a vertically reciprocable plunger above said belt, a die on said plunger, a pressure roller below and in contact with said belt, and means for moving said pressure roller in an orbit comprising the outline of said die.

22. Cutting apparatus comprising a support in the form of a sheet of metal or similar material, a vertically reciprocating die above said support, a movable plate below said support, and a roller on said plate in contact with the under side of the support.

23. Cutting apparatus comprising a support in the form of a sheet of metal or similar material, a vertically reciprocating die above said support, a rotary plate below said support, and a roller on said plate in contact with the under side of said support, the orbit of said roller comprising the outline of said die.

24. Cutting apparatus comprising a support in the form of a sheet of metal or similar material, a vertically reciprocating die above the support, a rotary plate below said support, a conical roller on said plate in contact with the under side of said support, the orbit of said roller covering the outline of said die.

25. Cutting apparatus comprising a support in the form of a sheet of metal or similar material, a vertically reciprocating die above said support, a movable plate below said support, and a roller on said plate in contact with the under side of the support, and means for feeding said support past said die.

26. Cutting apparatus comprising a support in the form of a sheet of metal or similar material, a vertically reciprocating die above said support, a rotary plate below said support, a roller on said plate in contact with the under side of said support, the orbit of said roller comprising the outline of said die, and means for feeding said support past said die.

27. Cutting apparatus comprising a support in the form of a sheet of metal or similar material, a vertically reciprocating die above the support, a rotary plate below said support, a conical roller on said plate in contact with the under side of said support, the orbit of said roller covering the outline of said die, and means for feeding said support past said die.

28. In a machine for cutting rubber, a continuous supporting belt, means for feeding said belt, a cutting die, means for moving said die toward and from said belt, a pressure element below said belt, and means for moving said pressure element transversely of said belt while the die is in contact with the rubber on the belt.

29. In a machine for cutting rubber a continuous supporting belt, means for feeding said belt intermittently, a vertically reciprocable cutting die above said belt, means for holding said die in contact with the rubber on said belt, a roller below said belt and means for moving said roller transversely of the belt.

30. In a machine for cutting rubber, a continuous supporting belt, means for feeding said belt intermittently, a vertically reciprocable cutting die above said belt, means for holding said die in contact with the rubber on said belt, a rotary plate below said belt, and a roller on said plate in contact with the underside of said belt.

31. In a machine for cutting rubber a continuous supporting belt, means for feeding said belt intermittently, a vertically reciprocable die above said belt, means for holding said die in contact with the rubber on said belt, a rotary plate below said belt, and a conical roller on said plate in contact with the under side of said belt, the orbit of said roller comprising the outline of said die.

32. In a machine for cutting rubber, a continuous supporting belt, means for feeding said belt intermittently, a vertically reciprocable cutting die above said belt, means for holding said die in contact with the rubber on the belt, a moving plate below said belt, and a roller on said plate, the path of the roller comprising the outline of the die.

FRANK J. MacDONALD.